(12) United States Patent
Moon et al.

(10) Patent No.: US 9,054,745 B2
(45) Date of Patent: Jun. 9, 2015

(54) APPARATUS FOR TRANSMITTING/RECEIVING ENERGY USING A RESONANCE STRUCTURE IN AN ENERGY SYSTEM

(75) Inventors: Jung-Ick Moon, Daejeon (KR); Je-Hoon Yun, Daejeon (KR); In-Kui Cho, Daejeon (KR); Seong-Min Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 713 days.

(21) Appl. No.: 13/333,107

(22) Filed: Dec. 21, 2011

(65) Prior Publication Data

US 2012/0161540 A1    Jun. 28, 2012

(30) Foreign Application Priority Data

Dec. 22, 2010 (KR) .................. 10-2010-0132606
Apr. 15, 2011 (KR) .................. 10-2011-0035094

(51) Int. Cl.
*H02J 17/00* (2006.01)
*H04B 5/00* (2006.01)
*H01F 38/14* (2006.01)
*H02J 5/00* (2006.01)

(52) U.S. Cl.
CPC ............ *H04B 5/0037* (2013.01); *H04B 5/0012* (2013.01); *H01F 2038/146* (2013.01); *H02J 5/005* (2013.01); *H04B 5/0075* (2013.01)

(58) Field of Classification Search
None
See application file for complete search history.

(56) References Cited

U.S. PATENT DOCUMENTS

| | | | |
|---|---|---|---|
| 2,229,404 A * | 1/1941 | Canon et al. | 336/65 |
| 2,598,467 A * | 5/1952 | Van Yzeren | 336/77 |
| 5,557,290 A * | 9/1996 | Watanabe | 343/713 |
| 6,963,305 B2 | 11/2005 | Knapp | |
| 7,894,770 B2 * | 2/2011 | Washiro | 455/41.1 |
| 2004/0134985 A1 | 7/2004 | Deguchi et al. | |
| 2009/0051224 A1 | 2/2009 | Cook et al. | |
| 2010/0036773 A1 | 2/2010 | Bennett | |
| 2010/0237707 A1 | 9/2010 | Karalis et al. | |
| 2010/0259111 A1 | 10/2010 | Ruocco et al. | |
| 2011/0090030 A1 * | 4/2011 | Pagani | 333/24 R |

FOREIGN PATENT DOCUMENTS

| | | |
|---|---|---|
| JP | 2004-206245 | 7/2004 |
| KR | 10-2004-0028312 | 4/2004 |
| KR | 10-2005-0013605 | 2/2005 |
| KR | 10-2007-0017804 | 2/2007 |
| KR | 10-2010-0057632 | 5/2010 |
| WO | 2004/004118 A1 | 1/2004 |

* cited by examiner

*Primary Examiner* — Rexford Barnie
*Assistant Examiner* — David Shiao
(74) *Attorney, Agent, or Firm* — Staas & Halsey LLP

(57) ABSTRACT

Disclosed is an energy transmitting apparatus in an energy system, including: a transmit feeding cable configured to be applied with AC power; a transmit inductor in which AC current for an AP power supply flows; a transmit metal electrode configured to transmit the AC power to a receive metal electrode by the AC current flowing the transmit inductor; and a transmit grounding bar configured to control at least one of a position, a length, and a diameter thereof to control a resonance frequency generated by the transmit inductor.

18 Claims, 8 Drawing Sheets

APPARATUS FOR TRANSMITTING/RECEIVING ENERGY USING A RESONANCE STRUCTURE IN AN ENERGY SYSTEM

CROSS-REFERENCES TO RELATED APPLICATIONS

The present application claims priority of Korean Patent Application Nos. 10-2010-0132606 and 10-2011-0035094, filed on Dec. 22, 2010 and Apr. 15, 2011, respectively, which are incorporated herein by reference in their entireties.

BACKGROUND OF THE INVENTION

1. Field of the Invention

Exemplary embodiments of the present invention relate to an energy system, and more particularly, to an apparatus for transmitting and receiving energy capable of efficiently transmitting electrical energy using a resonance structure in an energy system.

2. Description of Related Art

A technology for wirelessly transmitting energy has characteristics similar to wireless communication using an antenna. In this case, transmitted energy may be electrical energy (for example, power, or the like). Recently, an energy transmission technology for providing energy to various mobile devices including mobile phones, home appliances, industrial devices, electric car, or the like has been focused.

An example of the energy transmission technology may include a magnetic coupling method and a magnetic resonance method. The magnetic coupling method winds a coil several times and transmits energy through magnetic induction in one direction. Therefore, the magnetic coupling method can transmit energy only in a very close distance. In addition, the magnetic resonance method transmits energy between the coil provided at the transmitting side and the coil provided at the receiving side through the resonance. The magnetic resonance method is hard to form resonance conditions for energy transmission due to a high quality (Q) factor.

The magnetic coupling method or the magnetic resonance method needs to include a separate circuit, for example, a lumped circuit element for controlling the resonance characteristics due to the resonance characteristics changed according to the coil.

SUMMARY OF THE INVENTION

An embodiment of the present invention is directed to an apparatus for transmitting and receiving energy in an energy system.

Another embodiment of the present invention is directed to an apparatus for transmitting and receiving energy for controlling resonance characteristics in an energy system.

Still another embodiment of the present invention is directed to an apparatus for transmitting and receiving energy for controlling resonance characteristics without a separate circuit in an energy system.

According an embodiment of the present invention, there is provided an energy transmitting apparatus in an energy system, including: a transmit feeding cable configured to be applied with AC power; a transmit inductor in which AC current for an AC power supply flows; a transmit metal electrode configured to transmit the AC power to a receive metal electrode by the AC current flowing the transmit inductor; and a transmit grounding bar configured to control at least one of a position, a length, and a diameter thereof to control a resonance frequency generated by the transmit inductor.

In accordance with another embodiment of the present invention, there is provided an energy receiving apparatus in an energy system, including: a receive metal electrode configured to be applied with AC power; a receive inductor in which AC current for an AC power supply flows; a feeding cable configured to output the AC power by the AC current flowing the receive inductor; and a receive grounding bar configured to control at least one of a position, a length, and a diameter thereof to control a resonance frequency generated by the receive inductor.

DESCRIPTION OF SPECIFIC EMBODIMENTS

Figure 1:
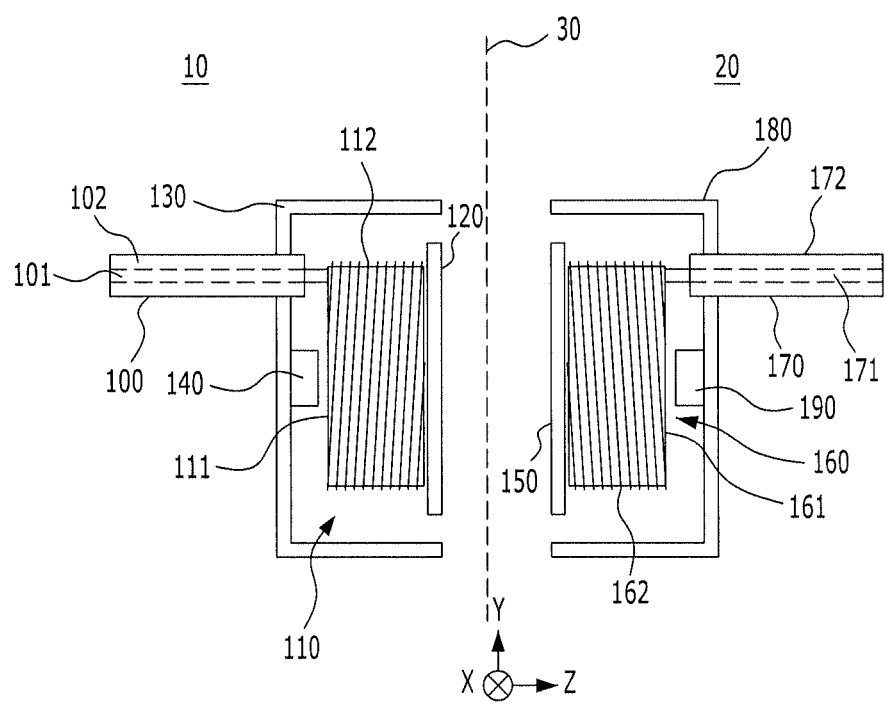
FIG. 1 is a diagram illustrating a system for transmitting and receiving energy in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Exemplary embodiments of the present invention propose a method for transmitting and receiving energy using an electric coupling method for energy transmission in an energy system. Here, the electric coupling method in accordance with the exemplary embodiments of the present invention uses electric field formed between metal electrodes to provide energy of a transmitting side to a receiving side. For example, the electric coupling method may use a one-to-one energy transmitting method when the energy of the transmitting side is provided to the receiving side.

Therefore, the system for transmitting and receiving energy in accordance with the exemplary embodiment of the present invention includes an energy transmitting apparatus transmitting energy and an energy receiving apparatus receiving the transmitted energy and providing energy to the connected devices. In this case, the transmitted energy may be power, or the like, as an example of electrical energy. Hereinafter, a system for transmitting and receiving energy in accordance with exemplary embodiments of the present invention will be described in more detail with reference to FIG. 1.

FIG. 1 is a diagram schematically illustrating a system for transmitting and receiving energy in accordance with an embodiment of the present invention.

Referring to FIG. 1, a system for transmitting and receiving energy is configured to include an energy transmitting apparatus 1Q and an energy receiving apparatus 20.

The energy transmitting apparatus 10 is configured to include a transmit feeding cable 100, a transmit inductor 110, a transmit metal electrode 120, a transmit cavity 130, and a transmit grounding bar 140.

The transmit feeding cable 100 is configured to include an inner core 101 of the transmit feeding cable and an outer core 102 of the transmit feeding cable. The inner core 101 of the transmit feeding cable is disposed in the outer core 102 of the transmit feeding cable. The transmit feeding cable 100 receives AC power for energy transmission and outputs the applied AC power to the transmit inductor 110.

The transmit inductor 110 is configured to include a transmit core 111 and a transmit coil 112. The transmit coil 112 is configured in a form in which a transmit core 111 is wound several times based on the transmit core 111. The transmit inductor 110 applies AC current to the transmit coil 112 according to the application of the AC power.

The transmit metal electrode 120 may transmit the AC current input from the transmit inductor 110 to a receive metal electrode 150 corresponding to the transmit metal electrode 120 in the form of energy, for example, AC power.

Further, the transmit cavity 130 is formed at the outside of the transmit inductor 110 so as to include the transmit inductor 110. The transmit cavity 130 may have at least one of the transmit feeding cable 100, the transmit metal electrode 120, and the transmit grounding bar 140 disposed therein.

The transmit grounding bar 140 may have a predetermined length so as to control resonance characteristics (for example, resonance frequency or impedance matching) generated by the transmit inductor 110 and the transmit metal electrode 120. The transmit grounding bar 140 may be adjacently disposed to the transmit inductor 110, for example, may be connected to the transmit cavity 130. The transmit grounding bar 140 is spaced apart from the receive inductor 110. The transmit grounding bar 140 may be configured in, for example, a cylindrical shape and a circular section of the transmit grounding bar 140 may have a predetermined diameter.

In addition, the energy receiving apparatus 20 is configured to include a receive metal electrode 150, a receive inductor 160, a receive feeding cable 170, a receive cavity 180, and a receive grounding bar 190.

The receive metal electrode 150 is applied with AC power through the transmit metal electrode 120. The receive metal electrode 150 outputs the AC power to the receive inductor 160. Here, the receive metal electrode 150 may form a capacitor for an AC power supply by including a void with the transmit metal electrode 120.

The receive inductor 160 is configured to include a receive core 161 and a receive coil 162. The receive coil 162 is configured in a form in which a receive core 161 is wound several times based on the receive core 161. The transmit inductor 160 applies the AC current to the receive coil 162 according to the application of the AC power.

The receive feeding cable 170 is configured to include an inner core 171 of the receive feeding cable and an outer core 172 of the transmit feeding cable. The receive feeding cable 170 may provide the energy of the receive inductor 160, for example, the AC power as a load. Here, the load includes devices using energy, for example, mobile devices, home appliances, industrial device, and an electric car. In addition, the load may also include a battery for supply power to the devices.

Further, the receive cavity 180 is formed at the outside of the receive inductor 160 so as to include the receive inductor 160. The receive cavity 180 may have at least one of the receive metal electrode 150, the receive feeding cable 170, and the receive grounding bar 190 disposed therein.

The receive grounding bar 190 may have a predetermined length so as to control the resonance characteristics generated by the receive inductor 160, for example, the resonance frequency. The receive grounding bar 190 may be adjacently disposed to the receive inductor 160, for example, may be connected to the receive cavity 180. The receive grounding bar 190 is spaced apart from the receive inductor 160. Here, the receive grounding bar 190 may be configured in, for example, a cylindrical shape and a circular section of the receive grounding bar 190 may have a predetermined diameter.

Therefore, the system for transmitting and receiving energy in accordance with the embodiment of the present invention uses the transmit grounding bar 140 or the receive grounding bar 190 having a length corresponding to the resonance characteristics to control the resonance characteristics, thereby transmitting energy.

Meanwhile, FIG. 1 is a side view of the energy transmitting apparatus 10 and the energy receiving apparatus 20 viewed from an X-axis direction, for example, a side among an x axis, a y axis, and a z axis indicating a direction on a space.

Figure 2A:
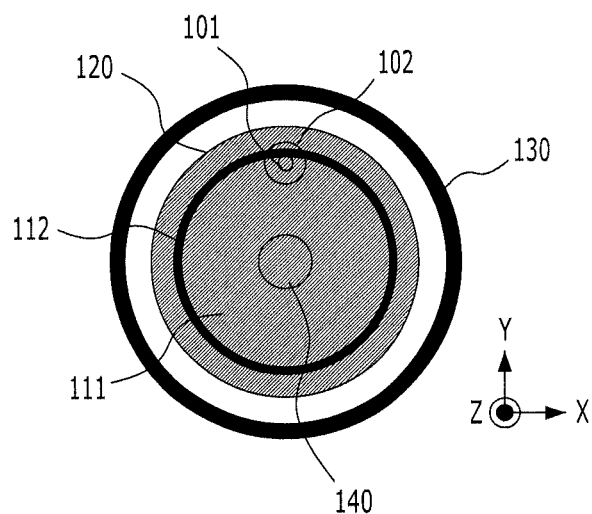
FIG. 2A is a front view illustrating an energy transmitting apparatus in the system for transmitting and receiving energy in accordance with the embodiment of the present invention in a z-axis direction.

FIG. 2A is a front view illustrating an energy transmitting apparatus in the system for transmitting and receiving energy in accordance with the embodiment of the present invention in a z-axis direction.

Referring to FIG. 2A, the transmit core 111, the transmit coil 112, the transmit metal electrode 120, and the transmit cavity 130 are sequentially disposed toward the outside from the transmit grounding bar 140 that is disposed at the center. The energy transmitting apparatus includes the inner core 101 of the transmit feeding cable connected to a portion of the transmit coil 112. The outer core 102 of the transmit feeding cable surrounding the inner core 101 of the transmit feeding cable is disposed.

The energy transmit apparatus 10 uses the transmit grounding bar 140 for controlling the resonance characteristics (for example, the resonance frequency and the impedance matching). The energy transmitting apparatus 10 may control the resonance frequency and the impedance matching by controlling the length and diameter of the transmit grounding bar 140. In addition, the energy radiation may be reduced by including the transmit inductor 110 in the transmit cavity 130.

As illustrated in FIG. 2A, sections of elements 140, 111, 112, 120, 130, 101, and 112 of the energy transmitting apparatus 10 may be, for example, a circle, but may be configured to have a triangle, a square, or a polygon. The energy transmitting apparatus 10 has a circular section and thus, may have a cylindrical structure. However, the energy transmitting apparatus 10 may be configured to have a conical structure.

Here, FIG. 2A is a diagram illustrating the energy transmitting apparatus 10 based on the section of a first reference axis 30 in the z-axis direction.

Figure 2B:
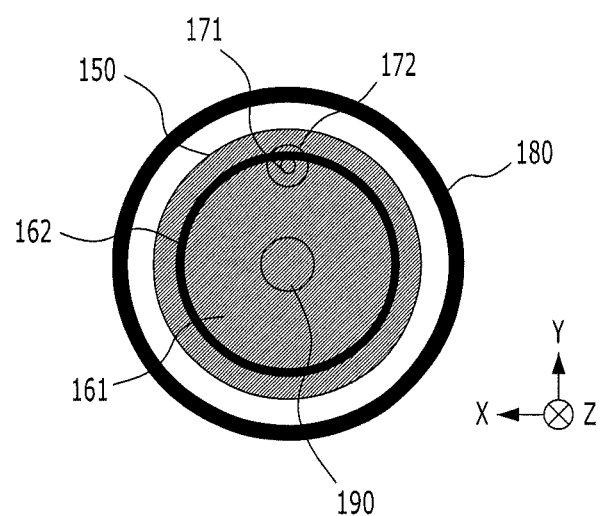
FIG. 2B is a front view illustrating an energy receiving apparatus in the system for transmitting and receiving energy in accordance with the embodiment of the present invention in a z-axis direction.

FIG. 2B is a front view illustrating an energy receiving apparatus in the system for transmitting and receiving energy in accordance with the embodiment of the present invention in a z-axis direction.

Referring to FIG. 2B, the receive core 161, the receive coil 162, the receive metal electrode 150, and the receive cavity 180 are sequentially disposed toward the outside from the receive grounding bar 190 that is disposed at the center. The energy receiving apparatus includes the inner core 171 of the receive feeding cable connected to a portion of the receive coil 162. In addition, the outer core 172 of the receive feeding cable surrounding the inner core 171 of the receive feeding cable is disposed.

The energy receive apparatus 20 uses the receive grounding bar 190 for controlling the resonance characteristics (for example, the resonance frequency and the impedance matching). The energy receive apparatus 20 may control the resonance characteristics by the control of at least one of the length and diameter of the receive grounding bar 190. In addition, the energy radiation may be prevented by including the receive inductor 160 in the receive cavity 180.

As illustrated in FIGS. 2A and 2B, sections of elements 190, 161, 162, 150, 180, 171, and 172 of the energy receiving apparatus 20 may be, for example, a circle, but may be configured to have a triangle, a square, or a polygon. The energy receiving apparatus 20 has a circular section and thus, may have a cylindrical structure. However, the energy receiving apparatus 20 may be configured to have a conical structure.

Here, FIG. 2B is a diagram illustrating the energy receiving apparatus 20 based on the section of the first reference axis 30 in the z-axis direction.

Meanwhile, it is assumed that the energy transmitting apparatus 10 and the energy receiving apparatus 20 described with reference to FIGS. 1, 2A, and 2B satisfy the same conditions below.

For example, the diameter of each of the transmit coil 112 and the receive coil 162 is 0.5 mm. The number of turns of each of the transmit coil 112 and the receive coil 162 is 15 times. In this case, an interval of the rotated transmit coil 112 and an interval of the rotated receive coil 161 each are 4 mm.

The diameter of each of the transmit core 111 and the receive core 161 is 20 cm. The diameter of each of the transmit metal electrode 120 and the receive electrode 150 is 20 cm and the length thereof is 2 cm. Further, the void between the transmit metal electrode 120 and the receive electrode 150 is 2 cm.

The diameter of each of the transmit cavity 130 and the receive cavity 180 is 30 cm and the depth thereof is 14.3 cm.

Further, the diameter of each of the transmit grounding bar 140 and the receive grounding bar 190 is 6 cm.

In this case, the resonance frequency of the system for transmitting and receiving energy in accordance with the embodiment of the present invention is 7.95 MHz and the transmission loss is −0.2587 dB.

The resonance frequency and the transmission loss of the system for transmitting and receiving energy according to the change in the length of the transmit grounding bar 140 and the receive grounding bar 190 may be represented by the following Table 1. In this case, it is assumed that the length of the transmit grounding bar 140 and the receive grounding bar 190 is equally changed.

TABLE 1

| Length of Grounding Bar [cm] | Resonance Frequency [MHz] | Transmission Loss [dB] |
| --- | --- | --- |
| 2 | 7.95 | 0.26 |
| 6 | 7.85 | 0.24 |
| 10 | 7.31 | 0.22 |
| 14 | 5.13 | 0.16 |

As the length of the transmit grounding bar 140 or the receive grounding bar 190 is increased, the resonance frequency is reduced and as the resonance frequency is reduced, the transmission loss is reduced. On the other hand, as the length of the transmit grounding bar 140 or the receive grounding bar 190 is reduced, the resonance frequency is increased and as the resonance frequency is increased, the transmission loss is increased.

That is, in the system for transmitting and receive energy in accordance with the embodiment of the present invention, the resonance characteristics and the impedance matching may be controlled through the change in length of the grounding bar, that is, the transmit grounding bar 140 and the receive grounding bar 190.

Figure 3:
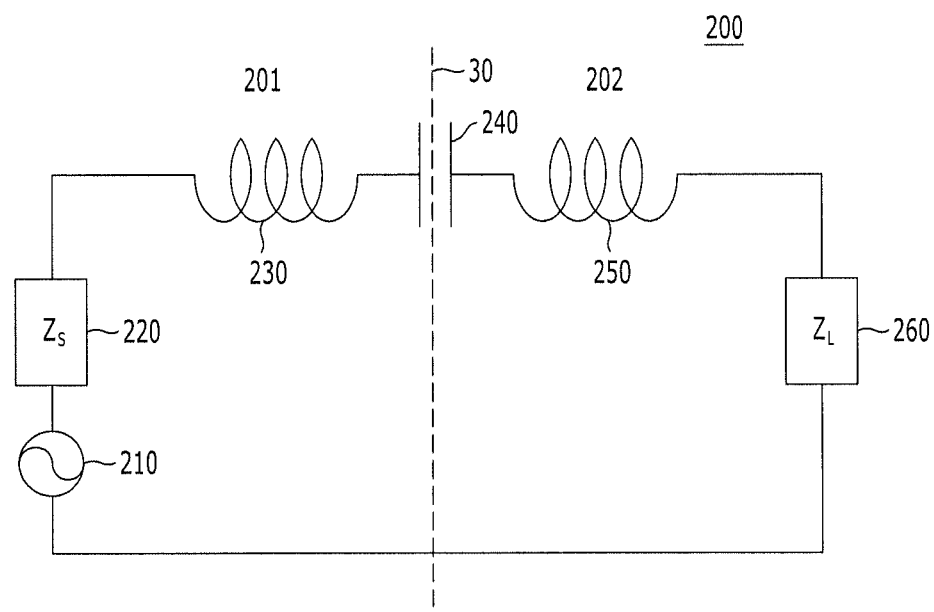
FIG. 3 is a diagram illustrating an equivalent circuit of the system for transmitting and receiving energy in accordance with the embodiment of the present invention.

FIG. 3 is a diagram illustrating an equivalent circuit of the system for transmitting and receiving energy in accordance with the embodiment of the present invention.

Referring to FIG. 3, an equivalent circuit of the system for transmitting and receiving energy is configured to include a power supply 210, power impedance Zs 220, first inductor L1 230, a capacitor C 240, a second inductor L2 250, and load impedance ZL 260.

The power supply 210 generates energy, for example, the AC power.

Further, the power impedance 220 represents the impedance component for the AC current.

The AC current may flow in the first inductor 230 and the second inductor 250 and the AC power may flow in the capacitor 240.

The load impedance 260 represents the use of the AC power, that is, the impedance component according to the use of energy.

For example, in the equivalent circuit, the first portion 201 disposed left based on the first reference axis 30 may correspond to the energy transmitting apparatus 10 and the second portion 202 disposed right based on the first reference axis 30 may correspond to the energy receiving apparatus 20.

In the equivalent circuit, the loss on the transmission line is disregarded. In addition, the equivalent circuit indicates the main component, that is, only the dominant element. Therefore, the equivalent circuit has a serial resonance form.

Figure 4:
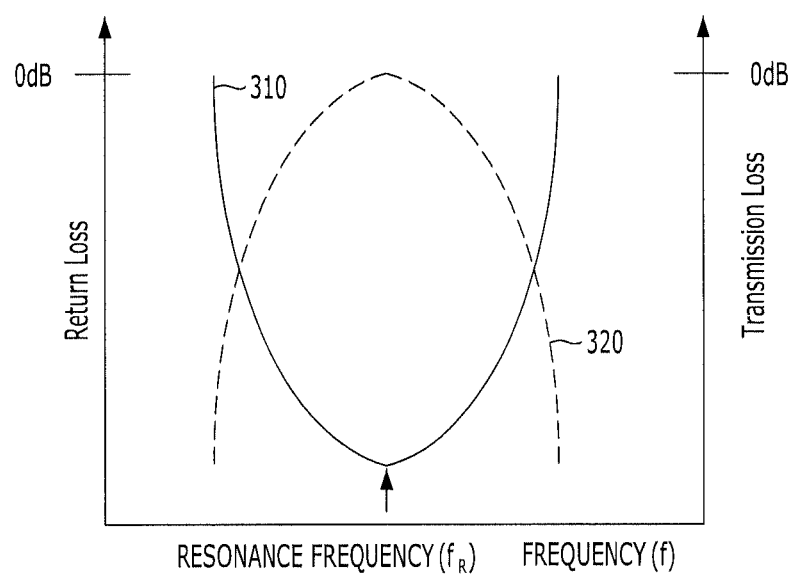
FIG. 4 is a graph illustrating a return loss and a transfer loss according to a change in a resonance frequency of the system for transmitting and receiving energy in accordance with the embodiment of the present invention.

FIG. 4 is a graph illustrating a return loss and a transfer loss according to a change in a resonance frequency of the system for transmitting and receiving energy in accordance with the embodiment of the present invention.

Referring to FIG. 4, a horizontal axis of the graph represents a frequency and a vertical axis represents the return loss and the transmission loss.

According to the change in frequency, a solid line 310 represents the return loss and a dotted line 320 represents the transmission loss. Based on the resonance frequency, the return loss is reduced and the transmission loss is increased as the frequency is smaller than the resonance frequency. Based on the resonance frequency, the return loss is reduced and the transmission loss is increased as the frequency is larger than the resonance frequency.

Figure 5:
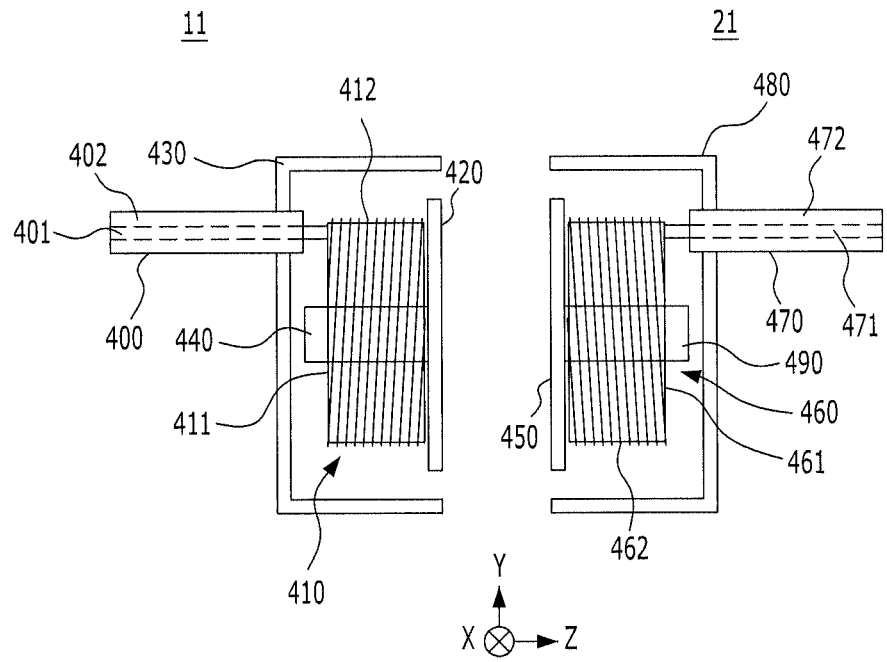
FIG. 5 is a diagram illustrating a system for transmitting and receiving energy in accordance with another embodiment of the present invention.

FIG. 5 is a diagram illustrating a system for transmitting and receiving energy in accordance with another embodiment of the present invention.

Referring to FIG. 5, the system for transmitting and receiving energy includes the energy transmitting apparatus 11 and the energy receiving apparatus 21.

The energy transmitting apparatus 11 is configured to include a transmit feeding cable 400, a transmit inductor 410, a transmit metal electrode 420, a transmit cavity 430, and a transmit grounding bar 440. The transmit feeding cable 400 is configured to include an inner core 401 of the transmit feeding cable and an outer core 402 of the transmit feeding cable. The transmit inductor 410 is configured to include a transmit core 411 and a transmit coil 412.

In addition, the energy receiving apparatus 21 is configured to include a receive metal electrode 450, a receive inductor 460, a receive feeding cable 470, a receive cavity 480, and a receive grounding bar 490. The receive inductor 460 is configured to include a receive core 461 and a receive coil 462. The receive feeding cable 470 is configured to include the inner core 171 of the receive feeding cable and the outer core 172 of the receive feeding cable.

The detailed structure of the energy transmitting apparatus 11 and the energy receiving apparatus 21 of FIG. 5 has a similar structure to the energy transmitting apparatus 10 and the energy receiving apparatus 20 in the system for transmitting and receiving energy illustrated in FIG. 1. Therefore, the detailed structure of the energy transmitting apparatus 11 and the energy receiving apparatus 21 of FIG. 5 will be described with reference to FIG. 1.

However, the transmit grounding bar 440 is spaced apart (that is, is not connected to) from the transmit cavity 430 in the energy transmitting apparatus 11 of FIG. 5. The transmit grounding bar 440 is connected to the transmit metal electrode 420. The transmit grounding bar 440 may be disposed in the transmit core 411. The transmit grounding bar 440 may be disposed at the center of the transmit core 411 and a portion or the entirety of the transmit grounding bar 440 may be included in the transmit core 411.

In addition, the receive grounding bar 490 is spaced apart (that is, is not connected) from the receive cavity 480 in the energy receiving apparatus 21. The transmit grounding bar 490 is connected to the receive metal electrode 450. The receive grounding bar 440 may be disposed in the receive core 461. The receive grounding bar 490 may be disposed at the center of the receive core 461 and a portion or the entirety of the receive grounding bar 490 may be included in the receive core 461.

It is assumed that the energy transmitting apparatus and the energy receiving apparatus 20 satisfy the conditions illustrated in FIGS. 2A and 2B. In this case, the resonance frequency and the transmission loss of the system for converting energy according to the change in the length of the transmit grounding bar 440 and the receive grounding bar 490 may be represented by the following Table 2.

TABLE 2

| Length of Grounding Bar [cm] | Resonance Frequency [MHz] | Transmission Loss [dB] |
|---|---|---|
| 2 | 7.93 | 0.28 |
| 6 | 7.61 | 0.27 |
| 10 | 7.17 | 0.20 |
| 14 | 5.21 | 0.11 |

As the length of the transmit grounding bar 440 or the receive grounding bar 490 is increased, the resonance frequency is reduced and as the resonance frequency is reduced, the transmission loss is reduced. On the other hand, as the length of each of the transmit grounding bar 440 or the receive grounding bar 490 is reduced, the resonance frequency is increased and as the resonance frequency is increased, the transmission loss is increased. In the system for transmitting and receiving energy of FIG. 5, the grounding bars, that is, the transmit grounding bar 440 and the receive grounding bar 490 are connected to the metal electrode, that is, the transmit metal electrode 420, and the receive metal electrode 450 rather than the cavity, that is, the transmit cavity 430, the receive cavity 480. Therefore, comparing Tables 1 and 2, the system for transmitting and receiving energy of FIG. 5 reduces most of the magnitude in the resonance frequency and the transmission loss, as compared with the system for transmitting and receiving energy of FIG. 1.

As a result, the system for transmitting and receiving energy in accordance with another embodiment of the present invention illustrated in FIG. 5 has similar characteristics to the system for transmitting and receiving energy in accordance with the embodiment of the present invention.

Figure 6:
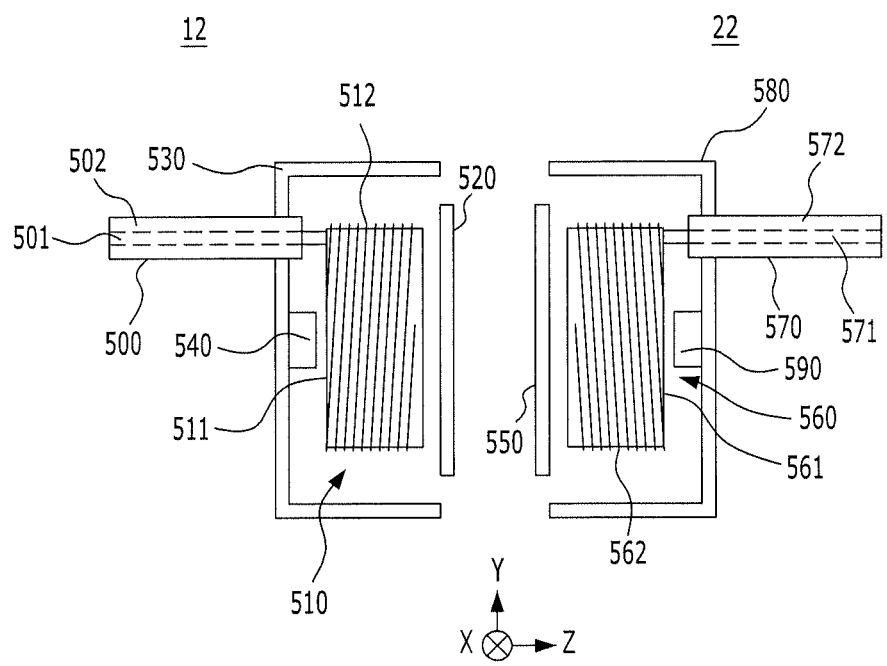
FIG. 6 is a diagram illustrating a system for transmitting and receiving energy in accordance with another embodiment of the present invention.

FIG. 6 is a diagram illustrating a system for transmitting and receiving energy in accordance with another embodiment of the present invention.

Referring to FIG. 6, a system for transmitting and receiving energy includes the energy transmitting apparatus 12 and the energy receiving apparatus 22.

The energy transmitting apparatus 12 is configured to include the transmit feeding cable 500, the transmit inductor 510, the transmit metal electrode 520, the transmit cavity 530, and the transmit grounding bar 540. The transmit feeding cable 500 is configured to include an inner core 501 of the transmit feeding cable and an outer core 502 of the transmit feeding cable. The transmit inductor 510 is configured to include the transmit core 511 and the transmit coil 512.

In addition, the energy receiving apparatus 22 is configured to include the receive metal electrode 550, the receive inductor 560, the receive feeding cable 570, the receive cavity 580, and the receive grounding bar 590. The receive inductor 560 is configured to include the receive core 561 and the receive coil 562. The receive feeding cable 570 includes the inner core 571 of the receive feeding cable and the outer core 572 of the receive feeding cable. The detailed structure of the energy transmitting apparatus 12 and the energy receiving apparatus 22 of FIG. 6 have a similar structure to the energy transmitting apparatus 10 and the energy receiving apparatus 20 illustrated in FIG. 1. Therefore, the detailed structure of the energy transmitting apparatus 12 and the energy receiving apparatus 22 of FIG. 6 will be described with reference to FIG. 1.

However, the transmit inductor 510 is spaced apart from the transmit metal electrode 520 in the energy transmitting apparatus 12 of FIG. 6.

In addition, the receive inductor 560 is spaced apart from the receive metal electrode 550 in the energy receiving apparatus 22.

Through the above configuration, a coupling is generated between the transmit metal electrode 520 and the transmit grounding bar 540 and a coupling is generated between the receive metal electrode 550 and the receive grounding bar 590.

The transmit metal electrode 520 may be applied with the AC power applied to the transmit inductor 510 through the coupling. The transmit metal electrode 520 transfers the applied AC power to the receive metal electrode 550. The receive metal electrode 550 may output the AC power transferred through the coupling to the receive inductor 560.

Figure 7:
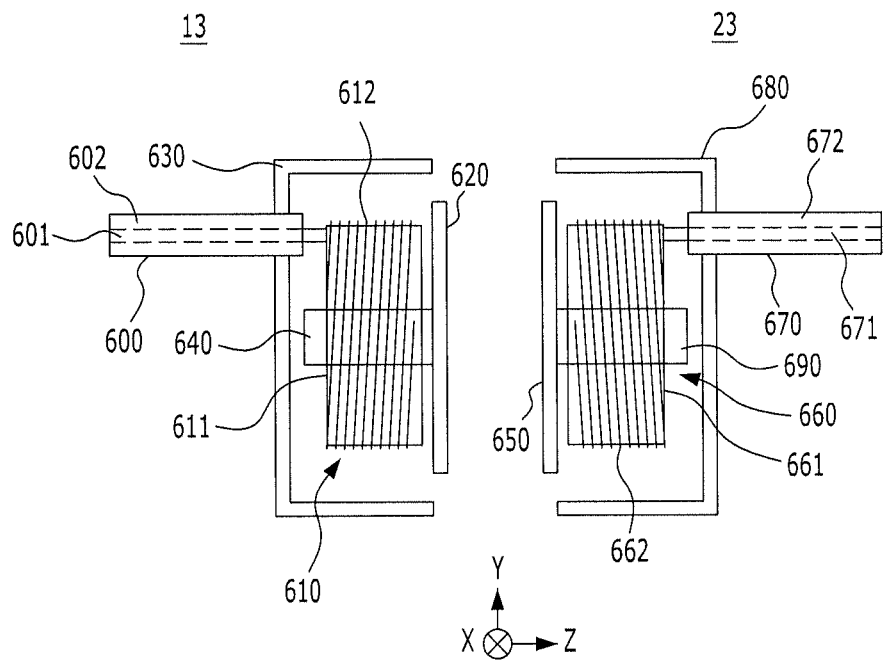
FIG. 7 is a diagram illustrating a system for transmitting and receiving energy in accordance with another embodiment of the present invention.

FIG. 7 is a diagram illustrating a system for transmitting and receiving energy in accordance with another embodiment of the present invention.

Referring to FIG. 7, a system for transmitting and receiving energy includes the energy transmitting apparatus 13 and the energy receiving apparatus 23.

The energy transmitting apparatus 13 is configured to include a transmit feeding cable 600, a transmit inductor 610, a transmit metal electrode 620, a transmit cavity 630, and a transmit grounding bar 640. The transmit feeding cable 600 is configured to include an inner core 601 of the transmit feeding cable and an outer core 602 of the transmit feeding cable. The transmit inductor 610 is configured to include a transmit core 611 and a transmit coil 612.

In addition, the energy receiving apparatus 23 is configured to include a receive metal electrode 650, a receive inductor 660, a receive feeding cable 670, a receive cavity 680, and a receive grounding bar 690. The receive inductor 660 is configured to include a receive core 661 and a receive coil 662. The receive feeding cable 670 is configured to include the inner core 671 of the receive feeding cable and the outer core 672 of the receive feeding cable.

The detailed structure of the energy transmit apparatus 13 and the energy receive apparatus 23 of FIG. 7 has a similar structure to the energy transmit apparatus 10 and the energy receive apparatus 20 in the system for transmitting and receiving energy illustrated in FIG. 1. Therefore, the detailed structure of the energy transmitting apparatus 13 and the energy receiving apparatus 23 of FIG. 7 will be described with reference to FIG. 1.

However, in the energy transmitting apparatus 13 of FIG. 7, the transmit grounding bar 640 is spaced apart from the transmit cavity 630 and the transmit grounding bar 640 is connected to the transmit metal electrode 620. The transmit inductor 610 is spaced apart from the transmit metal electrode 620. The transmit grounding bar 640 may be disposed at the center of the transmit core 611 and a portion or the entirety of the transmit grounding bar 440 may be included in the transmit core 611.

In addition, in the energy receiving apparatus 23, the receive grounding bar 690 is spaced apart from the receive cavity 680 and the receive grounding bar 690 is connected with the receive metal electrode 650. The receive inductor 660 is spaced apart from the receive metal electrode 650. The receive grounding bar 690 may be disposed at the center of the receive core 661 and a portion or the entirety of the receive grounding bar 490 may be included in the receive core 661.

It is assumed that the energy transmitting apparatus and the energy receiving apparatus 23 satisfy the conditions illustrated in FIGS. 2A and 2B. In this case, the resonance frequency and the transmission loss of the system for transmitting and receiving energy in accordance with the embodiment of the present invention illustrated in FIG. 1 and the system for transmitting and receiving energy in accordance with another embodiment of the present invention illustrated in FIG. 7 are represented by the following Table 3.

TABLE 3

| Void Interval (2 cm) | Resonance Frequency [MHz] | Transmission Loss [dB] |
|---|---|---|
| Embodiment of FIG. 1 | 6.63 | 0.14 |
| Embodiment of FIG. 7 | 7.32 | 0.13 |

In FIG. 7, that is, the coils 612 and 662 each included in the inductors 610 and 660 have an opened structure together with the metal electrodes 620 and 650. Therefore, in the system for transmitting and receiving energy of FIG. 7 (fourth embodiment), the magnitude of the resonance frequency is increased and the transmission loss is reduced, as compared with the system for transmitting and receiving energy of FIG. 1.

Figure 8:
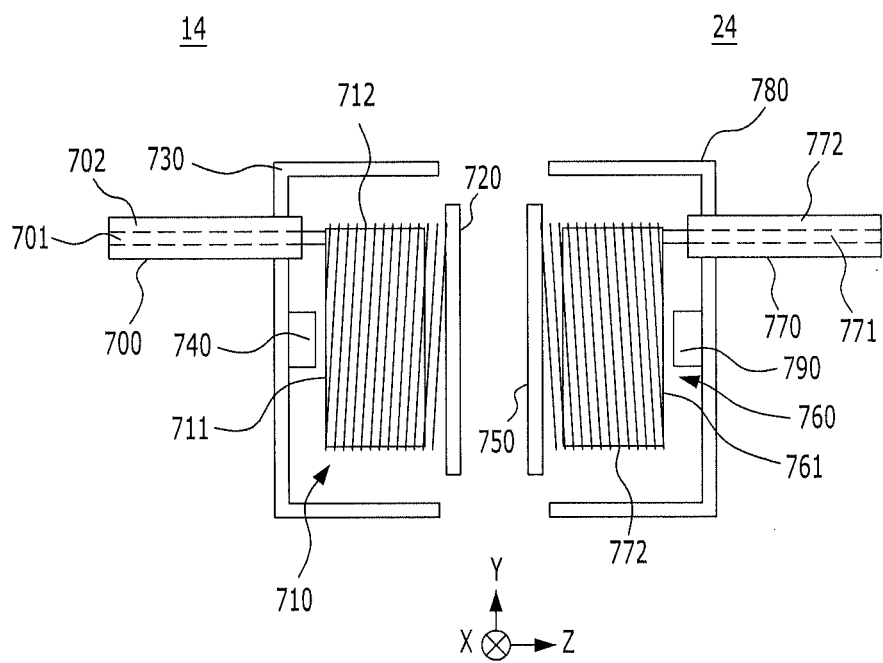
FIG. 8 is a diagram illustrating a system for transmitting and receiving energy in accordance with another embodiment of the present invention.

FIG. 8 is a diagram illustrating a system for transmitting and receiving energy in accordance with another embodiment of the present invention.

Referring to FIG. 8, a system for transmitting and receiving energy includes the energy transmitting apparatus 14 and the energy receiving apparatus 24.

The energy transmitting apparatus 14 is configured to include a transmit feeding cable 700, a transmit inductor 710, a transmit metal electrode 720, a transmit cavity 730, and a transmit grounding bar 740. The transmit feeding cable 700 is configured to include an inner core 701 of the transmit feeding cable and an outer core 702 of the transmit feeding cable. The transmit inductor 710 is configured to include a transmit core 711 and a transmit coil 712.

In addition, the energy receiving apparatus 24 is configured to include a receive metal electrode 750, a receive inductor 760, a receive feeding cable 770, a receive cavity 780, and a receive grounding bar 790. The receive inductor 760 is configured to include a receive core 761 and a receive coil 762. The receive feeding cable 770 is configured to include the inner core 771 of the receive feeding cable and the outer core 772 of the receive feeding cable.

The detailed structure of the energy transmit apparatus 14 and the energy receive apparatus 24 of FIG. 8 has a similar structure to the energy transmit apparatus 10 and the energy receive apparatus 20 in the system for transmitting and receiving energy illustrated in FIG. 1. Therefore, the detailed structure of the energy transmitting apparatus 14 and the energy receiving apparatus 24 of FIG. 8 will be described with reference to FIG. 1.

However, the transmit core 711 is spaced apart from the transmit metal electrode 720 in the energy transmitting apparatus 14 of FIG. 8. The transmit coil 712 is inserted into the transmit metal electrode 720. The transmit grounding bar 740 is connected with the transmit cavity 730 and is spaced apart from the transmit core 711.

In addition, the receive core 761 is spaced apart from the receive metal electrode 750 in the energy receiving apparatus 24. The receive coil 762 is inserted into the receive metal electrode 750. The receive grounding bar 790 is connected with the receive cavity 780 and is spaced apart from the receive core 761.

It is assumed that the energy transmitting apparatus 14 and the energy receiving apparatus 24 satisfy the conditions illustrated in FIGS. 2A and 2B. However, the length of the transmit grounding bar 740 or the receive grounding bar 790 is 14 cm, the number of turns of the transmit coil 712 or the receive coil 762 is 25 times and the diameter of the transmit core 711 or the receive core 761 is 6 cm.

In this case, the resonance frequency and the transmission loss of the system for transmitting and receiving energy in accordance with the embodiment of the present invention illustrated in FIG. 1 and the system for transmitting and receiving energy in accordance with another embodiment of the present invention illustrated in FIG. 8 are represented by the following Table 4.

TABLE 4

| Void Interval (2 cm) | Resonance Frequency [MHz] | Transmission Loss [dB] |
| --- | --- | --- |
| Embodiment of FIG. 1 | 5.13 | 0.16 |
| Embodiment of FIG. 8 | 5.67 | 0.09 |

In FIG. 8, the cores 711 and 761 included in the inductors 710 and 760, respectively, are spaced apart from the metal electrodes 720 and 750 and the coils 712 and 762 are inserted into the metal electrodes 720 and 750. Therefore, in the system for transmitting and receiving energy of FIG. 8, the magnitude of the resonance frequency is increased and the transmission loss is reduced, as compared with the system for transmitting and receiving energy of FIG. 1.

Figure 9:
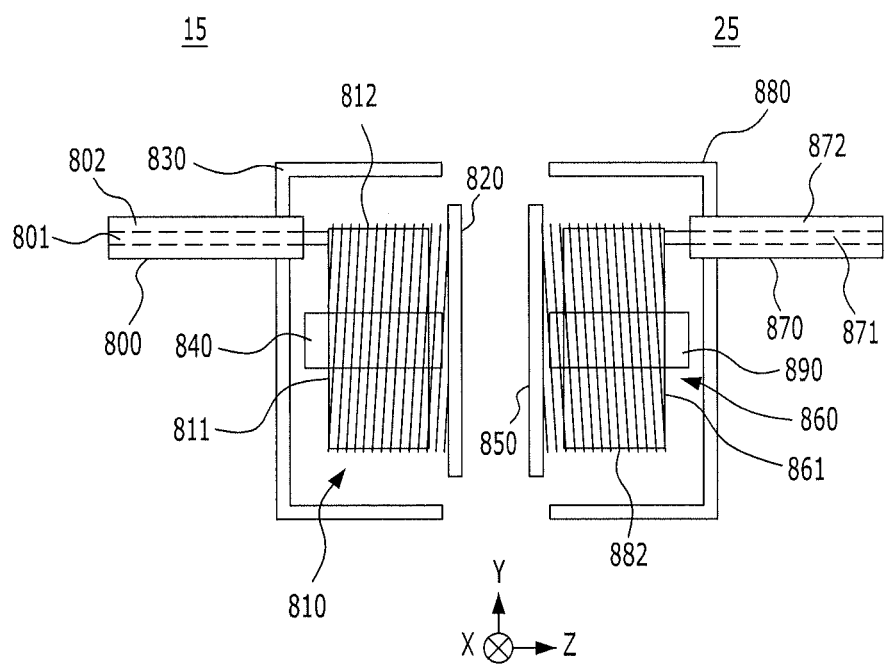
FIG. 9 is a diagram illustrating a system for transmitting and receiving energy in accordance with another embodiment of the present invention.

FIG. 9 is a diagram illustrating a system for transmitting and receiving energy in accordance with another embodiment of the present invention.

Referring to FIG. 9, the system for transmitting and receiving energy includes the energy transmitting apparatus 15 and the energy receiving apparatus 25.

The energy transmitting apparatus 15 is configured to include a transmit feeding cable 800, a transmit inductor 810, a transmit metal electrode 820, a transmit cavity 830, and a transmit grounding bar 840. The transmit feeding cable 800 is configured to include an inner core 801 of the transmit feeding cable and an outer core 802 of the transmit feeding cable. The transmit inductor 810 is configured to include a transmit core 811 and a transit coil 812.

In addition, the energy receiving apparatus 25 is configured to include a receive metal electrode 850, a receive inductor 860, a receive feeding cable 870, a receive cavity 880, and a receive grounding bar 890. The receive inductor 860 is configured to include a receive core 861 and a receive coil 862. The receive feeding cable 870 is configured to include the inner core 871 of the receive feeding cable and the outer core 872 of the receive feeding cable.

The detailed structure of the energy transmit apparatus 15 and the energy receive apparatus 25 has a similar structure to the energy transmit apparatus 10 and the energy receive apparatus 20 in the system for transmitting and receiving energy illustrated in FIG. 1. Therefore, the detailed structure of the energy transmitting apparatus 15 and the energy receiving apparatus 25 of FIG. 9 will be described with reference to FIG. 1.

However, in the energy transmitting apparatus 15 of FIG. 9, the transmit core 811 is spaced apart from the transmit metal electrode 820 and the transmit coil 812 is connected with the transmit metal electrode 820.

In addition, in the energy receiving apparatus 25, the receive core 861 is spaced apart from the receive metal electrode 850 and the receive coil 862 is connected to the receive metal electrode 850.

Here, FIG. 9 has the following difference from FIG. 8.

The transmit grounding bar 840 (or, the receive grounding bar 890) is disposed at the center of the core and is not connected with the transmit metal electrode 820 (or the receive metal electrode 850) and the transmit cavity 830 (or, the receive cavity 880).

The system for transmitting and receiving energy of FIG. 9 has an effect that the interval between the coils wound on the core is controlled.

Figure 10:
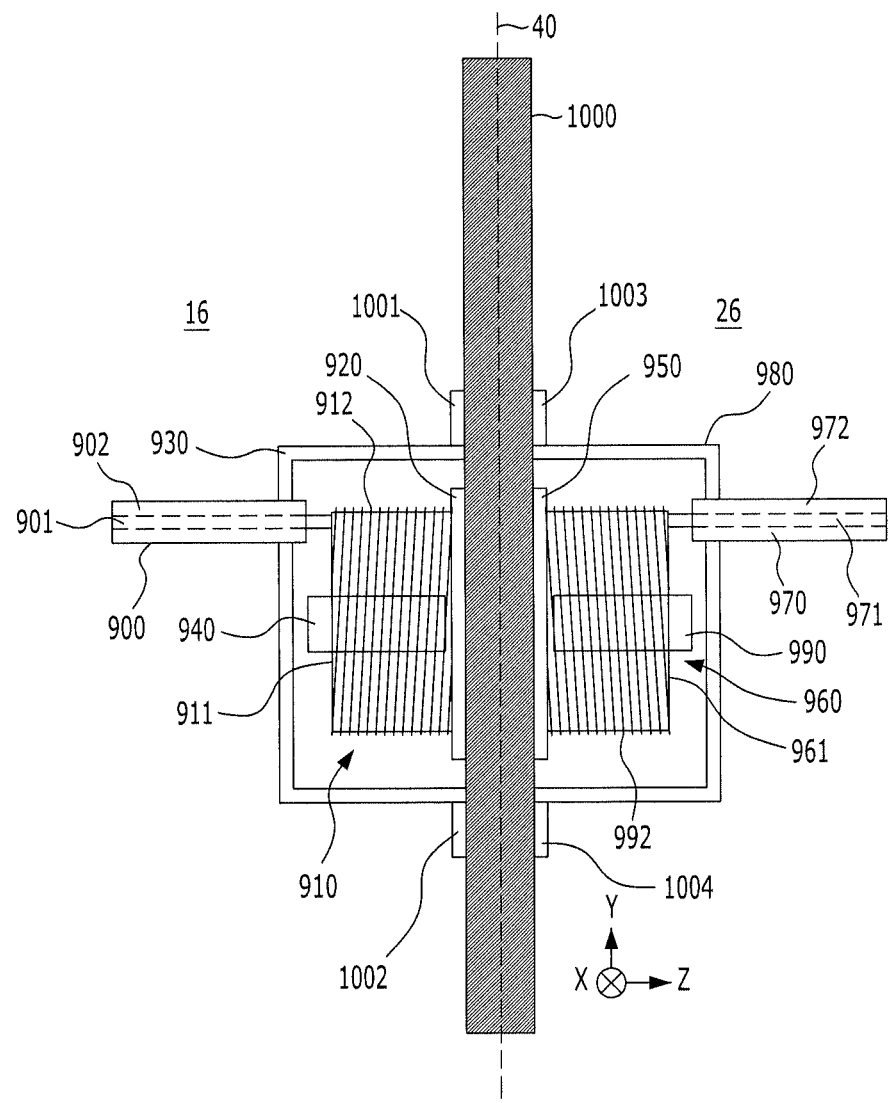
FIG. 10 is a diagram illustrating a system for transmitting and receiving energy in accordance with another embodiment of the present invention.

FIG. 10 is a diagram illustrating a system for transmitting and receiving energy in accordance with another embodiment of the present invention.

Referring to FIG. 10, a system for transmitting and receiving energy includes the energy transmitting apparatus 16 and the energy receiving apparatus 26.

The energy transmitting apparatus 16 is configured to include a transmit feeding cable 900, a transmit inductor 910, a transmit metal electrode 920, a transmit cavity 930, and a transmit grounding bar 940. The transmit feeding cable 900 is configured to include an inner core 901 of the transmit feeding cable inner core and an outer core 902 of the transmit feeding cable outer core. The transmit inductor 910 is configured to include a transmit core 911 and a transit coil 912.

In addition, the energy receiving apparatus 26 is configured to include a receive metal electrode 950, a receive inductor 960, a receive feeding cable 970, a receive cavity 980, and a receive grounding bar 990. The receive inductor 960 is configured to include a receive core 961 and a receive coil 962. The receive feeding cable 970 is configured to include the inner core 971 of the receive feeding cable and the outer core 972 of the receive feeding cable.

The detailed structure of the energy transmit apparatus 16 and the energy receive apparatus 26 has a similar structure to the energy transmit apparatus 10 and the energy receive apparatus 20 in the system for transmitting and receiving energy illustrated in FIG. 1. Therefore, the detailed structure of the energy transmitting apparatus 16 and the energy receiving apparatus 26 of FIG. 10 will be described with reference to FIG. 1.

However, a dielectric material 1000 is inserted into the transmit metal electrode 920 of the energy transmitting apparatus 16 and the receive metal electrode 950 of the energy receiving apparatus 26 of FIG. 10. The dielectric material 1000 is disposed in the void between the transmit metal electrode 920 and the receive metal electrode 950.

Here, FIG. 10 illustrates magnetic materials 1001, 1002, 1003, and 1004 so as to attach the dielectric material 1000 between the energy transmitting apparatus 16 and the energy receiving apparatus 26 Here, the first magnetic material 1001 and the third magnetic material 1003 are each connected with the energy transmitting apparatus 16 and the energy receiving apparatus 26, respectively to fix the dielectric material 100 to the void and the second magnetic material 1002 and the fourth magnetic material 1004 are each connected with the energy transmitting apparatus 16 and the energy receiving apparatus 26, respectively to fix the dielectric material 1000 to the void.

Meanwhile, the magnetic materials 1001, 1002, 1003, and 1004 may be implemented in an electromagnet. In this case, the first magnetic material 1001 and the second magnetic material 1002 may rectify the RF energy output from the energy transmitting apparatus 16 to operate the electromagnet and the third magnetic material 1003 and the fourth magnetic material 1004 may rectify the RF energy output from the energy receiving apparatus to operate the electromagnet. In this case, the first magnetic material 1001 and the third magnetic material 1003 have different polarities, that is, (+) polarity or (−) polarity therebetween and the second magnetic material 1002 and the fourth magnetic material 1004 have different polarities, that is, (+) polarity or (−) polarity therebetween.

In this case, even though a method for attaching the dielectric material 1000 using magnetism is described by way of example, the dielectric material may be directly attached to the energy transmitting apparatus 16 and the energy receiving apparatus 26, respectively.

In this case, in the system for transmitting and receiving energy in accordance with the embodiment of the present invention illustrated in FIG. 10, when the dielectric material is not present in the void and when the dielectric material is present in the void, the resonance frequency and the transmission loss of the system for transmitting and receiving energy are shown in Table 5. In this case, it is assumed that a relative dielectric constant of the dielectric material is 5.5.

TABLE 5

| Void or Dielectric Interval [cm] | Normalization Resonance Frequency (Void) | Transmission Loss [dB] (Void) | Normalization Resonance Frequency (Dielectric Material) | Transmission Loss [dB] (Dielectric Material) |
|---|---|---|---|---|
| 1 | 1.00 | 0.21 | 0.92 | 0.14 |
| 4 | 0.96 | 0.18 | 0.77 | 0.10 |
| 10 | 0.92 | 0.21 | 0.66 | 0.25 |
| 15 | 0.89 | 0.29 | 0.64 | 0.58 |

Here, when there is the dielectric material rather than the void, the resonance frequency is low at the same thickness. Therefore, the resonance characteristics may be controlled through the insertion of the dielectric material into the void.

Figure 11A:
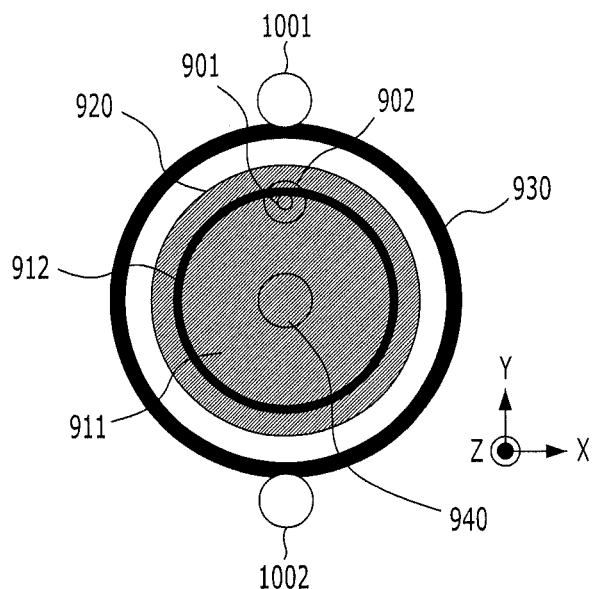
FIG. 11A is a front view illustrating an energy transmitting apparatus in the system for transmitting and receiving energy in accordance with another embodiment of the present invention in a z-axis direction.

FIG. 11A is a front view illustrating an energy transmitting apparatus in the system for transmitting and receiving energy in accordance with another embodiment of the present invention in a z-axis direction. Here, FIG. 11A is a diagram illustrating the energy transmitting apparatus of FIG. 10.

Referring to FIG. 11A, the front view of the energy transmitting apparatus 16 is similar to the front view of the energy transmitting apparatus 10 illustrated in FIG. 2A.

The transmit core 911, the transmit coil 912, the transmit metal electrode 920, and the transmit cavity 930 are sequentially disposed toward the outside from the transmit grounding bar 940 that is disposed at the center. The energy transmitting apparatus includes the inner core 901 of the transmit feeding cable connected to a portion of the transmit coil 912. The outer core 902 of the transmit feeding cable surrounding the inner core 901 of the transmit feeding cable is disposed.

As illustrated in FIG. 2A, sections of elements 940, 911, 912, 920, 930, 901, and 912 of the energy transmitting apparatus 16 may be, for example, a circle, but may be configured to have a triangle, a square, or a polygon. The energy transmitting apparatus 16 has a circular section and thus, may have a cylindrical structure. However, the energy transmitting apparatus 16 may be configured to have a conical structure.

In addition, the magnetic materials for the attachment of the dielectric material 1000 is added and thus, the first magnetic material 1001 and the second magnetic material 1002 are disposed to the outside of the transmit cavity 930.

Here, FIG. 11A is a diagram illustrating the energy transmitting apparatus 16 illustrated in FIG. 10 based on the section of a second reference axis 40 in the z-axis direction.

Figure 11B:
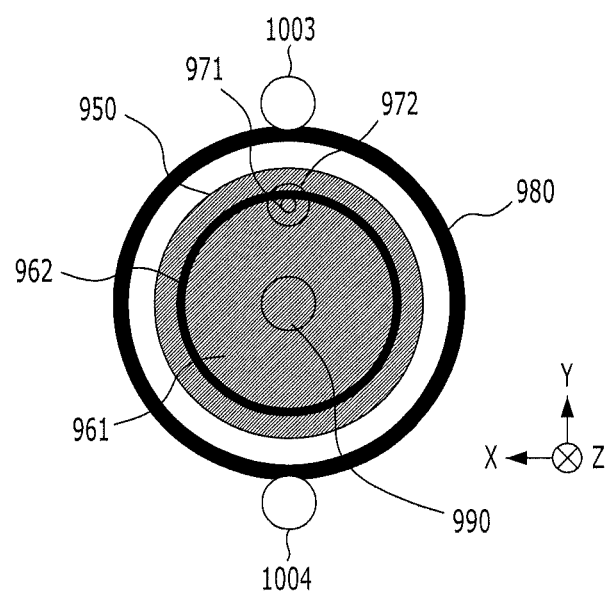
FIG. 11B is a front view illustrating an energy receiving apparatus in the system for transmitting and receiving energy in accordance with another embodiment of the present invention in a z-axis direction.

FIG. 11B is a front view illustrating an energy receiving apparatus in the system for transmitting and receiving energy in accordance with the embodiment of the present invention in a z-axis direction. Here, FIG. 11B is a diagram illustrating the energy receiving apparatus of FIG. 10.

Referring to FIG. 11B, the front view of the energy receiving apparatus 26 is similar to the front view of the energy receiving apparatus 20 illustrated in FIG. 2B.

The receive core 961, the receive coil 962, the receive metal electrode 950, and the receive cavity 980 are sequentially disposed toward the outside from the receive grounding bar 990 that is disposed at the center. The energy receiving apparatus includes the inner core 971 of the receive feeding cable connected to a portion of the receive coil 962. In addition, the outer core 972 of the receive feeding cable surrounding the inner core 971 of the receive feeding cable is disposed.

As illustrated in FIGS. 2A and 2B, sections of elements 990, 961, 962, 950, 980, 971, and 972 of the energy receiving apparatus 26 may be, for example, a circle, but may be configured to have a triangle, a square, or a polygon. The energy receiving apparatus 26 has a circular section and thus, may have a cylindrical structure. However, the energy receiving apparatus 26 may be configured to have a conical structure.

In addition, the magnetic materials for the attachment of the dielectric material 1000 is added and thus, the third magnetic material 1003 and the fourth magnetic material 1004 are disposed to the outside of the receive cavity 980.

Here, FIG. 11B is a diagram illustrating the energy receiving apparatus 26 illustrated in FIG. 10 based on the section of a second reference axis 40 in the z-axis direction.

As described above, in the embodiments of the present invention, the system for transmitting and receiving energy may be implemented by various embodiments. Meanwhile, in the energy transmitting apparatuses 10, 11, 12, 13, 14, 15, and 16, the transmit cores 111, 411, 511, 611, 711, 811, and 911 and the transmit coils 112, 412, 512, 612, 712, 812, and 912 in the transmit inductors 110, 410, 510, 610, 710, 810, and 910 may be implemented in a helical form by example of way, but may be implemented in a thin type by using the spiral form. Meanwhile, in the energy receiving apparatuses 20, 21, 22, 23, 24, 25, and 26, the transmit cores 161, 461, 561, 661, 761, 861, and 961 and the receive coils 162, 462, 562, 762, 862, and 962 in the receive inductors 160, 460, 560, 660, 760, 860, and 960 may be implemented in a helical form by example of way, but may be implemented in a thin type by using the spiral form.

As described above, the system for transmitting and receiving the embodiments of the present invention can control the resonance characteristics, for example, the resonance frequency by the control of the length of the grounding bar, the control of the position of the grounding bar, the interval control between the inductor and the metal electrode, the connection or the insertion between the coil in the inductor and the metal electrode, the control of the dielectric insertion having permittivity in the void, or the like. In addition, the resonance characteristics including the impedance matching can be controlled by controlling the diameter of the grounding bar. Through this, the energy transmitting system can control the resonance characteristics controlling the structural characteristics of components in the energy transmitting apparatus and the energy receiving apparatus.

Further, in the system for transmitting and receiving energy in accordance with the exemplary embodiments of the present invention, the energy transmitting apparatuses 10, 11, 12, 13, 14, 15, and 16 and the energy receiving apparatuses 20, 21, 22, 23, 24, 25, and 26 may be identically controlled between the corresponding components at the time of the control of the structural characteristics. However, the energy transmitting apparatuses 10, 11, 12, 13, 14, 15, and 16 and the energy receiving apparatuses 20, 21, 22, 23, 24, 25, and 26 may be differently controlled for the control of the resonance characteristics.

Further, in the system for transmitting and receiving energy in accordance with the embodiments of the present invention, the energy transmitting apparatuses 10, 11, 12, 13, 14, 15, and 16 are connected or included to or in a charge station, or the like, providing energy to transmit energy and the energy receiving apparatuses 20, 21, 22, 23, 24, 25, and 26 are attached to the devices using energy such as mobile devices, home appliances, industrial devices, electric car, or the like, or attached to a battery for the devices to wirelessly receive energy.

As set forth above, the exemplary embodiment of the present invention can control the structural characteristics of the components in the energy transmitting apparatus and the energy receiving apparatus in the energy system, thereby controlling the resonance characteristics without the separate circuit for controlling resonance characteristics.

While the present invention has been described with respect to the specific embodiments, it will be apparent to those skilled in the art that various changes and modifications may be made without departing from the spirit and scope of the invention as defined in the following claims.

What is claimed is:

1. An energy transmitting apparatus in an energy system, comprising:
    a transmit feeding cable configured to be applied with AC power;
    a transmit inductor in which AC current for an AC power supply flows;
    a transmit metal electrode configured to transmit the AC power wirelessly to a receive metal electrode by the AC current flowing through the transmit inductor;
    a transmit cavity formed outside of the transmit inductor; and
    a transmit grounding bar configured to control a resonance frequency generated by the transmit inductor based on at least one of a position, a length, and a diameter of the transmit grounding bar,
    wherein the transmit grounding bar directly connects to at least one of the transmit metal electrode and the transmit cavity.

2. The energy transmitting apparatus of claim 1, wherein the length of the transmit grounding bar is controlled to have an increased length so as to reduce a magnitude of the resonance frequency and is controlled to have a reduced length so as to increase the magnitude of the resonance frequency.

3. The energy transmitting apparatus of claim 1, wherein the transmit cavity at least partially encloses the transmit inductor.

4. The energy transmitting apparatus of claim 1, wherein the transmit inductor includes a transmit coil in which the AC current flows and a transmit core around which the transmit coil is wound, and
    the transmit grounding bar is spaced apart from the transmit core.

5. The energy transmitting apparatus of claim 1, wherein the transmit inductor includes a transmit coil in which the AC current flows and a transmit core around which the transmit coil is wound, and
    the transmit grounding bar is controlled so as to be at least partially disposed in the transmit core.

6. The energy transmitting apparatus of claim 5, wherein the transmit core is connected with the transmit metal electrode, and
    the transmit coil is inserted into the transmit metal electrode.

7. The energy transmitting apparatus of claim 5, wherein the transmit core is spaced apart from the transmit metal electrode, and
    the transmit coil is connected with the transmit metal electrode.

8. The energy transmitting apparatus of claim 1, wherein the transmit metal electrode is disposed at a distance from the receive metal electrode corresponding to the transmit metal electrode, and
    wherein the distance creates a void having a predetermined interval for controlling the resonance frequency.

9. The energy transmitting apparatus of claim 8, further comprising a dielectric material disposed in the void and having a predetermined dielectric constant for controlling the resonance frequency.

10. An energy receiving apparatus in an energy system, comprising:
    a receive metal electrode configured to be applied with AC power;
    a receive inductor in which AC current for an AC power supply flows;
    a receive feeding cable configured to output the AC power by the AC current flowing through the receive inductor;
    a receive cavity formed outside of the receive inductor; and
    a receive grounding bar configured to control a resonance frequency generated by the receive inductor based on at least one of a position, a length, and a diameter of the receive grounding bar,
    wherein the receive grounding bar directly connects to at least one of the receive metal electrode and the receive cavity.

11. The energy receiving apparatus of claim 10, wherein the length of the receive grounding bar is controlled to have an increased length so as to reduce a magnitude of the resonance frequency and is controlled to have a reduced length so as to increase the magnitude of the resonance frequency.

12. The energy receiving apparatus of claim 10, wherein the receive cavity least partially encloses the receive inductor.

13. The energy receiving apparatus of claim 10, wherein the receive inductor includes a receive coil in which the AC current flows and a receive core around which the receive coil is wound, and
    the receive grounding bar is spaced apart from the receive core.

14. The energy receiving apparatus of claim 10, wherein the receive inductor includes a receive coil in which the AC current flows and a receive core around which the receive coil is wound, and
    the receive grounding bar is controlled so as to be at least partially disposed in the receive core.

15. The energy receiving apparatus of claim 14, wherein the receive core is spaced apart from the receive metal electrode, and
    the receive coil is inserted into the receive metal electrode.

16. The energy receiving apparatus of claim 14, wherein the receive core is connected with the receive metal electrode, and
    the receive coil is connected with the receive metal electrode.

17. The energy receiving apparatus of claim 10, wherein the receive metal electrode is disposed at a distance from a transmit metal electrode corresponding to the receive metal electrode, and
    wherein the distance creates a void having a predetermined interval for controlling the resonance frequency.

18. The energy receiving apparatus of claim 17, further comprising a dielectric material disposed in the void and having a predetermined dielectric constant for controlling the resonance frequency.

* * * * *